United States Patent [19]

MacCuaig

[11] 4,366,607
[45] Jan. 4, 1983

[54] OVERCENTER TENSIONING ENGAGEMENT AND RELEASE DEVICE

[75] Inventor: Stuart J. MacCuaig, London, Canada

[73] Assignee: Dominion Chain Inc., Stratford, Canada

[21] Appl. No.: 193,158

[22] Filed: Oct. 2, 1980

[51] Int. Cl.³ ............................................. B66F 3/00
[52] U.S. Cl. ........................................ 24/270; 254/243
[58] Field of Search .................... 24/270, 271, 273; 254/243, 251, 253

[56] References Cited

U.S. PATENT DOCUMENTS

| | | |
|---|---|---|
| 1,510,035 | 9/1924 | Bradley . |
| 1,972,346 | 9/1934 | Juline . |
| 2,947,514 | 8/1960 | Goss ..................................... 24/270 |
| 3,119,278 | 1/1964 | Simpson ................................ 74/544 |
| 3,120,370 | 2/1964 | Sause, Jr. . |
| 3,149,821 | 9/1964 | Wallace ................................. 24/270 |
| 3,395,892 | 8/1968 | Ratcliff . |
| 3,591,141 | 7/1971 | Ratcliff ................................. 24/270 |
| 3,726,507 | 4/1973 | Rymsza ................................ 24/270 |
| 3,826,469 | 7/1974 | Ratcliff et al. ....................... 24/270 |
| 3,842,426 | 10/1974 | Ratcliff et al. . |

Primary Examiner—Gene Mancene
Assistant Examiner—Robert P. Swiatek
Attorney, Agent, or Firm—Ridout & Maybee

[57] ABSTRACT

In a load binder of the overcenter type having an operating lever comprising a handle portion acting through a crank mechanism to which a tensile load is connected, the lever is connected to the crank mechanism by a pivotal connection which provides a degree of lost motion, thereby enabling the crank mechanism to overrun the operating lever on passing the dead center position.

7 Claims, 12 Drawing Figures

OVERCENTER TENSIONING ENGAGEMENT AND RELEASE DEVICE

This invention relates to mechanisms of the overcentre type for selectively securing or releasing a tensile load. Mechanisms of this type have numerous applications, one particularly important application being to load binders.

A conventional load binder comprises essentially an operating lever having a crank portion and an elongated handle portion extending therefrom, and a pair of tensile load carrying members connected to the crank portion by respective pivotal connections, the tensile load carrying members being attached to the ends of a chain or like hold down member to be tensioned for securing a load. To secure a load the operating lever is rotated so as to rotate the crank portion through a dead centre position from an open or load release position to a closed or load tensioning position, the configuration of the lever providing a mechanical advantage by which a considerable tensile force may be applied to the hold down member. In the overcentre position of the lever this tensile force acts to secure the load binder in the closed position. In order to release the load it is necessary to rotate the lever against this tensile force, initially, and beyond the dead centre position beyond which the tension of the hold down element is automatically released. However, as is well known in the art, the release operation is highly dangerous since at the moment of tension release the operating lever is subjected to sudden forces causing it to fly. "Flying" of the handle portion of the operating lever upon release of the tensile load is a frequent cause of severe personal injury.

Numerous modifications of the basic load binder mechanism have been proposed for the purpose of minimizing the risk of personal injury. One such modification is described, for example, in U.S. Pat. No. 3,842,426 to Ratcliff, dated Oct. 15, 1974. However, although these prior proposals, and especially the Ratcliff proposals, go a long way towards solving the problem of ensuring operational safety, they involve structural complications and have not gained wide user acceptance. An ideal mechanism would be one which ensured safe operation with minimal departure from the basic structure of the conventional overcentre load binder.

It is an object of the present invention to provide a load binder, or more generally an overcentre tensioning engagement and release device, which combines the advantages of operational safety and structural simplicity. Essentially, this is achieved by articulating the handle portion of the operating lever to the crank portion so as to provide a degree of lost motion between them whereby the crank portion can overrun the handle portion on passing the dead centre position.

Thus, an overcentre tensioning engagement and release device according to the invention comprises an overcentre tensioning engagement and release device comprising a crank member and an operating lever extending therefrom, and first and second tensile load carrying members pivotally connected to said crank member by respective pivotal connections, means defining a third pivotal connection between the operating lever and said crank member, the operating lever being pivotally movable with respect to the crank member between first and second limit positions defined by angularly spaced abutment means on said crank member, the operating lever being selectively engageable with said abutment means for rotating the crank member through a dead centre position between respective load tensioning and load release positions, and said third pivotal connection constituting a lost motion connection permitting the crank member to overrun the operating lever when the crank member is rotated past the dead centre position.

In order that the invention may be readily understood, two embodiments thereof will now be described, by way of example, with reference to the accompanying drawings in which.

Figure 1:
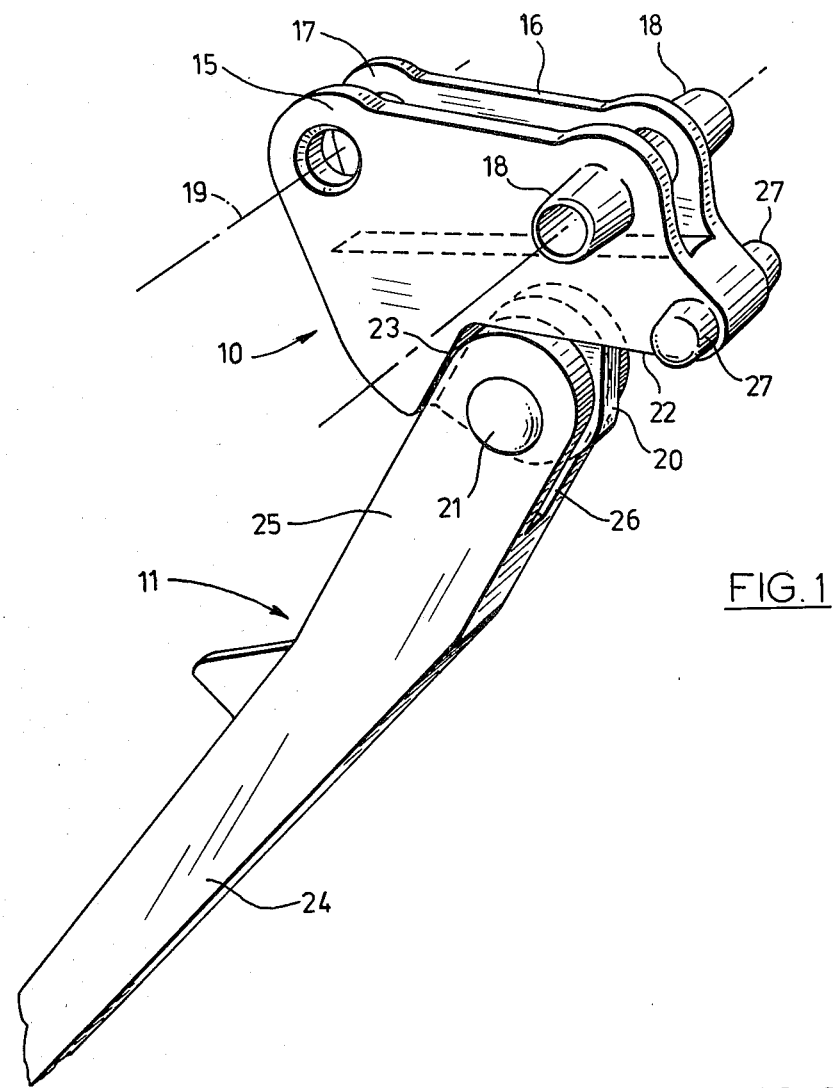
FIG. 1 is a perspective view of one load binder in accordance with the invention, the tensile load carrying members being omitted from this view for clarity of illustration.
Figure 2:
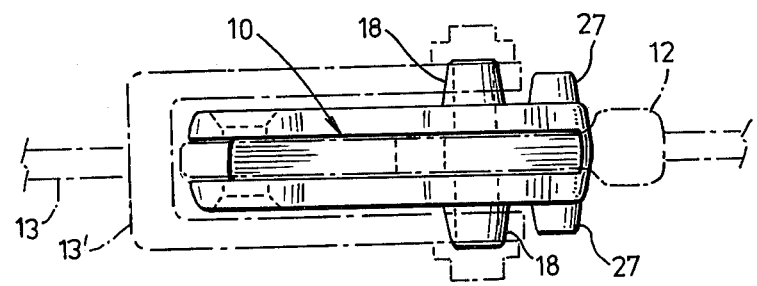
FIG. 2 is a partial plan view of the load binder in its closed or load tensioning condition.

The overcentre load binder illustrated in FIGS. 1 to 6 comprises essentially a crank member 10, an operating lever 11, and a pair of grab members 12, 13 which serve as tensile load carrying members to which a cable, chain or other suitable hold down element 14 to be tensioned, is secured at its ends. The crank member 10 comprises a pair of plate-like side portions 15, 16 defining a clevis recess 17. A pivot pin 19 extending between the side portions 15, 16 provides a first pivotal connection to one of the grab members 12, which extends into the clevis recess. The other grab member 13 is formed at its end with a clevis 13' which embraces the side portions 15, 16, the latter providing a pair of outwardly extending trunnions 18 on which the clevis 13' is swivelled.

The crank member 10 further comprises a stepped portion 20 through which a pivot pin 21, providing a third pivotal connection to the operating lever 11, extends. The pivotal axes defined by the pivot pin 19, the pair of trunnions 18, and the pivot pin 21, are parallel to one another and perpendicular to the medial plane of the crank member. Each of the side portions of the crank member 10 provides a pair of angularly spaced edges 22, 23, subtending an obtuse angle with one another. These angularly spaced edges define with the stepped portion 20 on each of its opposite sides a sector shaped rebate.

The operating lever 11 has a handle portion 24 towards one end, and an offset or dogleg portion 25 towards the other end. This other end of the lever is bifurcated, the bifurcations defining a slot 26 of sufficient width to receive the stepped portion 20 of the crank member, the latter extending into the slot and being pivotally connected to the end portion of the operating lever by the pivot pin 21. Thus, the operating lever 11 is pivotally movable with respect to the crank member 10 between limit positions defined by the abutment edges 22, 23, the offset portion 25 of the operating lever 11 being selectively engageable with the abutment edges according to the direction in which the lever is manually rotated. By such engagement the operating lever 11 is coupled to the crank member 10 for rotating the latter to secure or release the tensile load, but the pivotal connection 21 provides a degree of lost motion, depending upon the angle between the abutment edges 22, 23, whereby the crank member will be caused to move around the operating lever in response to the tensile forces acting on the grab elements 12, 13 when it is rotated past the dead centre position.

Figure 3:
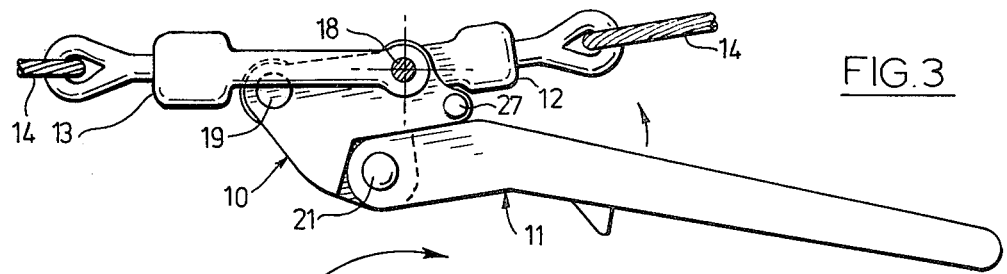
FIGS. 3 to 6 are side elevations of the load binder illustrating successive stages of its operation during load release.
Figure 4:
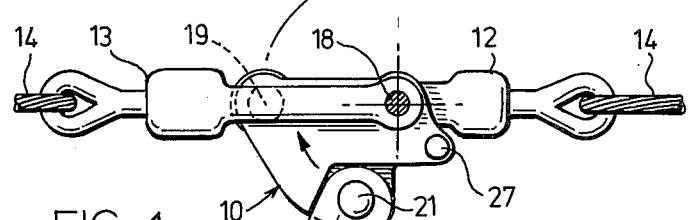
Figure 5:
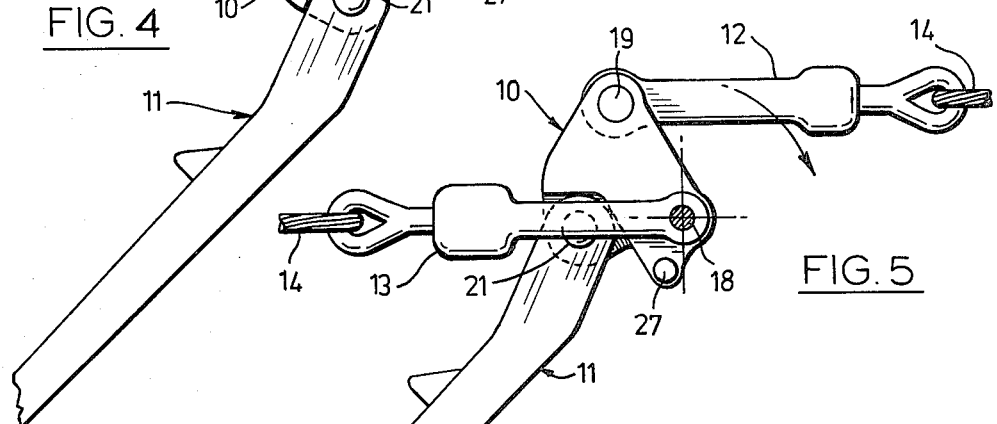
Figure 6:
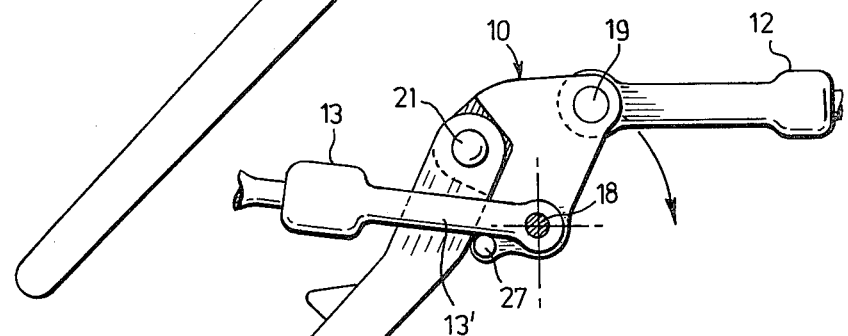
Figure 7:
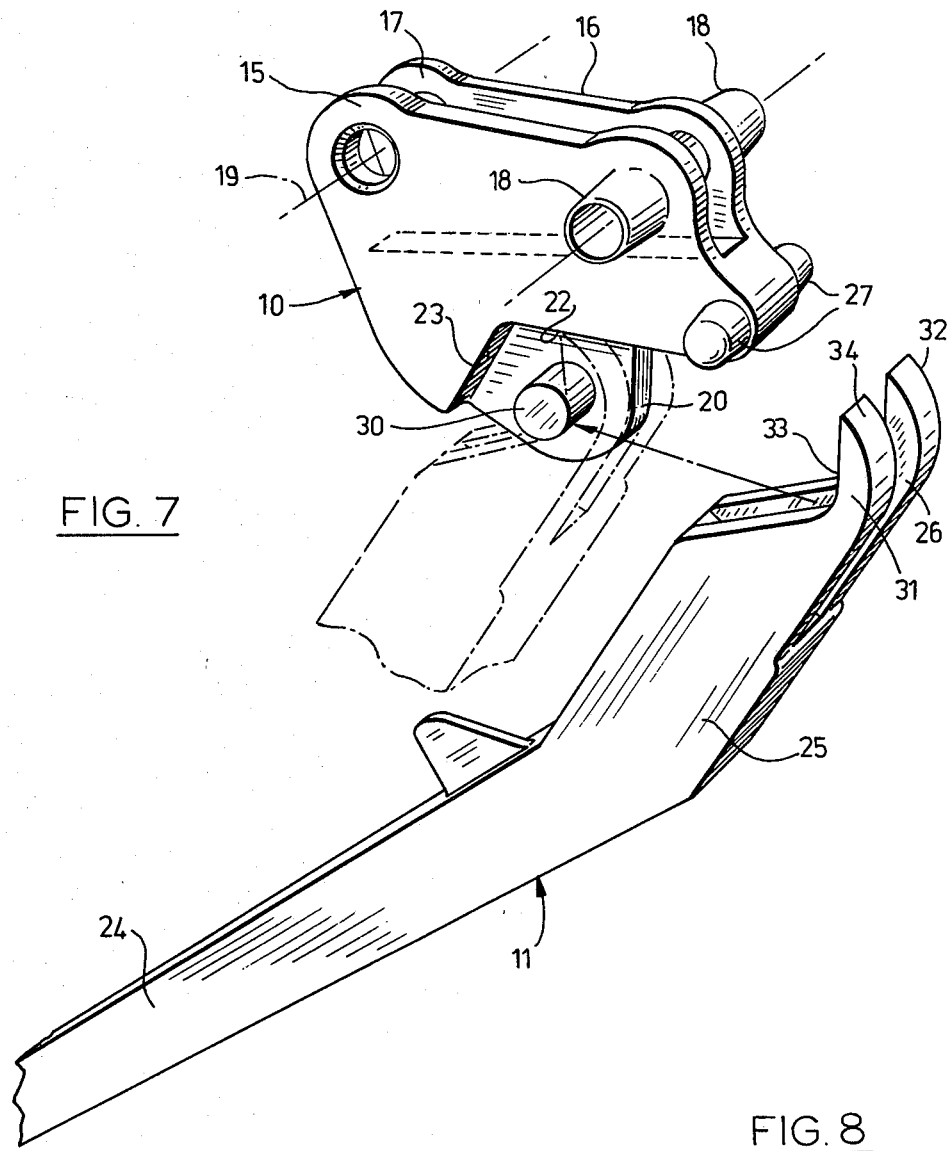
FIG. 7 is a perspective view of an alternative load binder in which the operating handle is a separate element.
Figure 8:
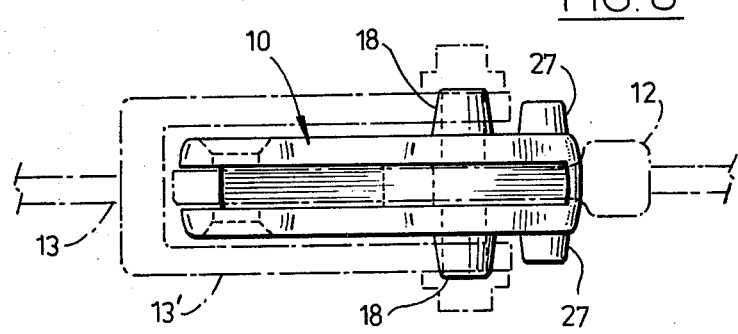
FIG. 8 is a view corresponding to FIG. 2 of the alternative load binder.

The operation is illustrated in FIGS. 3 to 6. FIG. 3 shows the configuration of the device in the closed or load tensioning position, the operating lever 11 having been rotated in the anticlockwise direction with its offset portion 25 engaging the abutment edges 22 of the crank member to rotate the latter past the dead centre position into the load tensioning position. By reason of the mechanical advantage offered by the operating lever, the hold down element 14 is under considerable tension. In order to release the load it is necessary to rotate the crank member 10 in the clockwise direction past the dead centre position, but first the operating lever must be rotated freely to the position shown in FIG. 4 at which the offset portion 25 of the handle is brought into engagement with the abutment edges 23. FIG. 4 shows the crank member having been rotated to the dead centre position. Further movement of the operating lever in the clockwise direction rotates the crank member 10 just past the dead centre position, whereupon the forces acting on the crank member cause the latter to rotate freely, overrunning the handle, which is no longer operatively engaged with the crank member. Thus the force exerted upon the crank member by sudden release of the tensile load is not transferred to the handle portion of the lever. The configuration of the device during such overrun or lost motion, is shown in FIG. 5. The crank member 10 comes to rest in the load release position shown in FIG. 6, wherein a pair of laterally projecting abutment stops 27 on the crank member abut against the clevis portion 13' of the load carrying member 13.

Referring now to FIGS. 7 to 12, the second overcentre load binder comprises, as in the case of the first load binder, a crank member 10, an operating lever 11, and a pair of tensile load carrying grab members 12, 13 to which the ends of the hold down element 14 are attached, the grab members 12, 13 being pivotally connected to the crank member 10 in the manner previously described with reference to FIGS. 1 to 6. The structure is basically the same as that shown in the previous figures, and corresponding structural parts are denoted by the same reference numerals, but there are certain differences which will now be described. The important difference between the two constructions is that the operating lever 11 of the second device, instead of being permanently connected to the crank member 10 by a permanent pivotal connection 21, is a separable member. The operating lever can be reversed for pivotal engagement with the crank member, and in this way the operator can take full advantage of the offset in the lever to achieve maximum purchase. In this case the third pivotal connection is formed by a pair of opposed trunnions 30 extending from opposite sides of the stepped portion 20 of the crank member. The operating lever has a handle portion 24 and an offset portion 25, which is bifurcated towards its end so as to define a slot 26 for receiving the stepped portion 20 of the crank member. This bifurcated end portion provides a pair of claw-like bearing members 31, 32. Each of these claw-like bearing members has an inner bearing surface 33 which is engageable with a respective one of the trunnions 30, and an outer bearing surface 34 which is engageable with a respective one of the abutment edges 22, 23 depending upon the direction of rotation of the handle. The manner of operation is illustrated in FIGS. 9 to 12.

Figure 9:
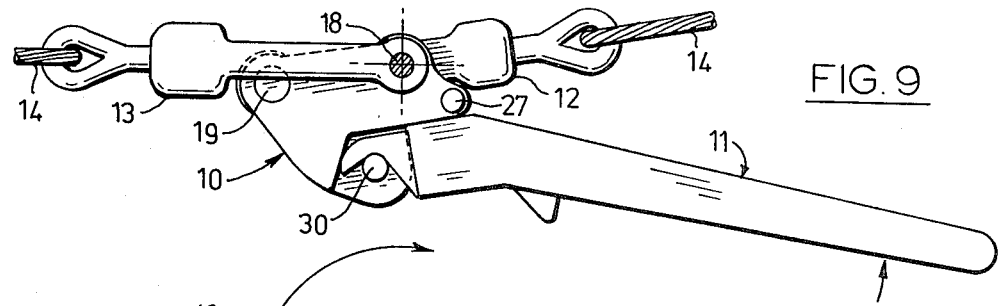
FIGS. 9 to 12 are views corresponding to FIGS. 3 to 6 illustrating successive stages of operation of this second load binder.
Figure 10:
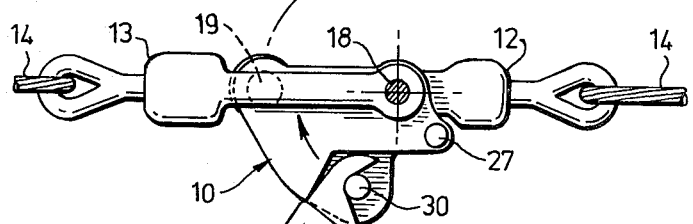
Figure 11:
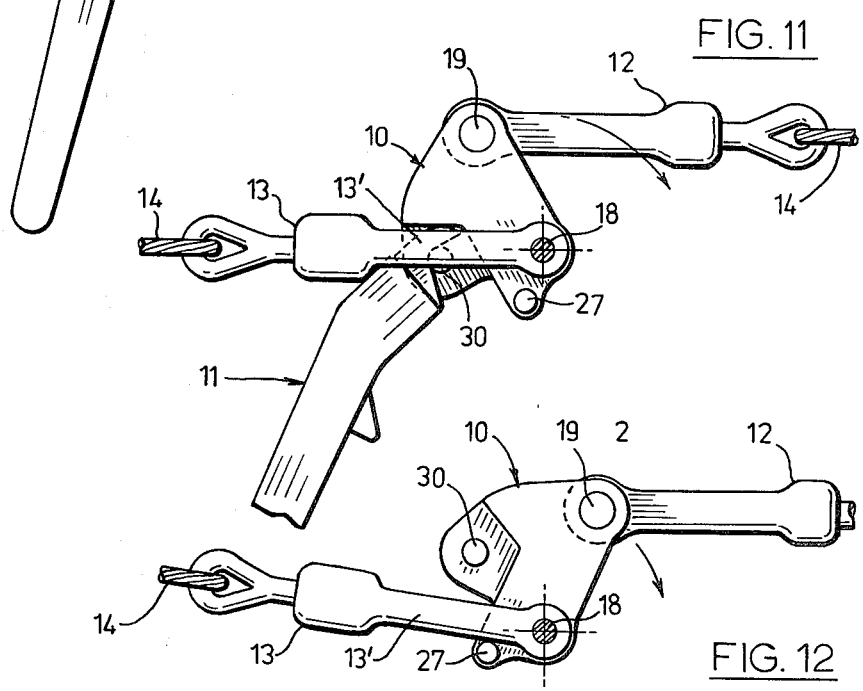
Figure 12:
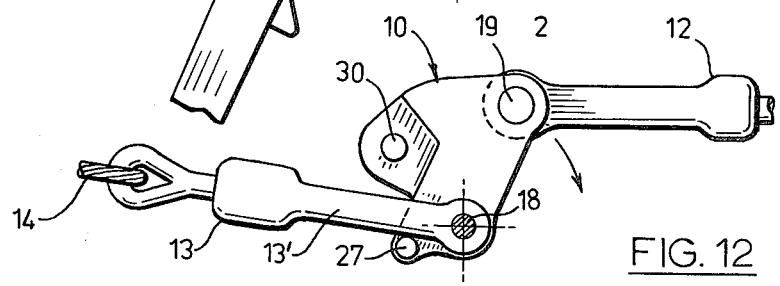

In FIG. 9 the device is shown in the closed or load tensioning position. The operating lever is shown in the position in which it is used to rotate the crank member to this position, the lever having been rotated in the anticlockwise direction with the inner bearing surfaces 33 of the claw-like members 31, 32 engaging the trunnions 30 and with the outer bearing surfaces 34 engaging the abutment edges 22 of the stepped portion of the crank member, the latter thereby being rotated past the dead centre position. In order to release the load it is necessary as before, to rotate the crank member 10 in the clockwise direction past the dead centre position. For this purpose the operating lever is first disengaged from the crank member, and is reversed with respect to the trunnion 30 so that the outer bearing surfaces 34 of the claw-like members 31, 32 will engage the other abutment edges 23 of the stepped portion of the crank member. FIG. 10 shows the operating lever so engaged, the crank member having been rotated just to the dead centre position. On being rotated past the dead centre position, the crank member immediately commences to rotate freely, overrunning the operating lever as illustrated in FIG. 11, and finally comes to rest in the open or load release position shown in FIG. 12 wherein the abutment stops 27 bear against the clevis portion 13' of the load carrying member 13.

Thus the invention, in each of the embodiments described, provides a load tensioning and release device which combines structural simplicity with operational safety. By means of the devices a considerable tension may be applied to the hold down element by manual operation of the operating lever 11. During such operation the operating lever positively engages the crank member so that these two members in combination act as one in the manner of a conventional load binder operating lever. However, on releasing the tensile load, the crank member automatically becomes decoupled from the operating lever and rotates freely to the stop position. Although the invention has been described with particular reference to load binders, it is to be understood that the invention has wider application to load tensioning and release devices of the overcentre type wherein a tensile force is applied manually through a lever and crank mechanism.

What I claim is:

1. An overcentre tensioning engagement and release device comprising a crank member and an operating lever extending therefrom, and first and second tensile load carrying members pivotally connected to said crank member by respective pivotal connections, means defining a third pivotal connection between the operating lever and said crank member, the operating lever being pivotally movable with respect to the crank member between first and second limit positions defined by angularly spaced abutment means on said crank member, the operating lever being selectively engageable with said abutment means for rotating the crank member through a dead centre position between respective load tensioning and load release positions, and said third pivotal connection constituting a lost motion connection permitting the crank member to overrun the operating lever when the crank member is rotated past the dead centre position.

2. A device as claimed in claim 1, wherein the crank member comprises a clevis portion defining a clevis recess and a stepped portion bounded by angularly spaced abutment edges constituting said abutment means, said first tensile load carrying member providing a clevis embracing said crank member and pivotally connected thereto, said second tensile load carrying member extending into said clevis recess and being pivotally connected to the crank member therein, and said third pivotal connection being located on said stepped portion of the crank member for pivotal engagement with the operating lever.

3. A device as claimed in claim 2, wherein said abutment edges subtend an obtuse angle with one another.

4. A device as claimed in claim 3, wherein said stepped portion of the crank member is bounded on opposite sides by respective pairs of angularly spaced abutment edges constituting said abutment means, the operating lever having a bifurcated end portion defining a slot to receive said stepped portion.

5. A device as claimed in claim 4, wherein said third pivotal connection is constituted by a pivot pin extending transversely through said stepped portion and said bifurcated end portion of the operating lever, said pivot pin securing the operating lever to the crank member.

6. A device as claimed in claim 4, wherein said third pivotal connection is constituted by a pair of opposed trunnions extending from opposite sides of said stepped portion, the operating lever being a separable member and said bifurcated end portion of the operating lever providing a pair of claw-like bearing portions each having a first bearing surface engageable with a respective one of said trunnions and a second bearing surface engageable with a respective one of said abutment edges.

7. A load binder of the overcentre type comprising:
a clevis member defining a clevis recess,
a first tensile load carrying member providing a clevis portion embracing said clevis member and pivotally connected thereto by a first pivotal connection,
a second tensile load carrying member extending into said clevis recess and pivotally connected to the clevis member by a second pivotal connection within the recess,
said clevis member further providing a stepped portion defining on opposite sides thereof a pair of sector-shaped rebates each bounded by a pair of angularly spaced abutment edges,
an operating lever having a handle portion at one end and a bifurcated portion at the other end, said bifurcated portion defining a slot for receiving said stepped portion of the clevis member,
means defining a pivotal connection between said stepped portion and said bifurcated end portion of the operating lever,
the operating lever being pivotally movable with respect to the clevis member between limit positions defined by said abutment edges,
and the lever being selectively engageable with said abutment edges for rotating said clevis member past a dead centre position at which the clevis member overruns the lever in response to the tensile force acting on said load carrying members.

* * * * *